United States Patent
Huang

(10) Patent No.: US 10,027,152 B2
(45) Date of Patent: Jul. 17, 2018

(54) CHARGING DEVICE

(71) Applicant: GETAC TECHNOLOGY CORPORATION, Hsinchu County (TW)

(72) Inventor: Tzu-Chiu Huang, New Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 134 days.

(21) Appl. No.: 14/806,534

(22) Filed: Jul. 22, 2015

(65) Prior Publication Data

US 2016/0156208 A1 Jun. 2, 2016

Related U.S. Application Data

(60) Provisional application No. 62/085,287, filed on Nov. 27, 2014.

(51) Int. Cl.
 *H02J 7/00* (2006.01)

(52) U.S. Cl.
 CPC ............ *H02J 7/0045* (2013.01); *H02J 7/007* (2013.01); *H02J 7/0013* (2013.01)

(58) Field of Classification Search
 CPC ........ G06F 1/1632; G06F 1/1635; G06F 1/16; G06F 13/00; H02J 7/0045; H02J 7/007; H02J 7/0013; H02J 7/00; H02J 7/02; H01R 13/60; H01R 35/00; H04B 1/38; H04M 1/11; H04M 1/03; B60R 11/00; B60R 11/02; H05K 7/16

USPC ........ 320/107, 114, 116, 106, 110, 111, 113; 439/551, 534, 929, 165, 164, 289, 135, 439/137, 138, 554, 557, 558, 500, 502, 439/121; 361/679.437, 725, 686
See application file for complete search history.

(56) References Cited

U.S. PATENT DOCUMENTS

| 6,204,632 B1* | 3/2001 | Nierescher | H02J 7/0013 320/106 |
|---|---|---|---|
| 2005/0162128 A1* | 7/2005 | Ebine | H01M 2/1066 320/114 |
| 2006/0250764 A1* | 11/2006 | Howarth | G06F 1/1632 361/679.41 |
| 2007/0139004 A1* | 6/2007 | Satsuma | H02J 7/0045 320/114 |
| 2008/0238366 A1* | 10/2008 | Kohata | H02J 7/0044 320/115 |
| 2009/0278495 A1* | 11/2009 | Kaye | H02J 7/0027 320/114 |

(Continued)

*Primary Examiner* — Nathaniel Pelton
*Assistant Examiner* — Dung V Bui

(57) ABSTRACT

A charging device including a charging base and at least one hook portion is provided. The charging base has a receiving chamber for receiving a battery. The receiving chamber includes a first sidewall. The first sidewall has a first side and a second side opposing the first side. The hook portion is disposed on the first sidewall, positioned proximate to the first side of the first sidewall, and adapted to fix the battery in place. When the battery begins to rotate under an applied force and therefore disconnect from the hook portion, the fulcrum of the rotating battery is positioned proximate to the second side of the first sidewall. The battery can be firmly inserted into the charging device. It is easy to insert and take out the battery.

20 Claims, 9 Drawing Sheets

(56) References Cited

U.S. PATENT DOCUMENTS

| | | | | |
|---|---|---|---|---|
| 2010/0109605 A1* | 5/2010 | Nakasho | ............... | H02J 7/0045 320/113 |
| 2011/0134601 A1* | 6/2011 | Sa | ......................... | G06F 1/1632 361/679.43 |
| 2012/0194132 A1* | 8/2012 | Ikegame | ............... | H02J 7/0045 320/113 |
| 2013/0328523 A1* | 12/2013 | Ota | ...................... | H02J 7/0045 320/107 |

\* cited by examiner

CHARGING DEVICE

BACKGROUND OF THE INVENTION

Field of the Invention

The present invention relates to charging devices and more particularly to a charging device for charging a battery.

Description of the Prior Art

Plenty electrical appliances (especially portable electrical appliances) are powered by built-in batteries. The batteries built in the electrical appliances are of two categories, namely non-separable batteries and separable batteries. Non-separable batteries are built in the electrical appliances and are not removable. To charge non-separable batteries, it is necessary to connect the electrical appliances directly with a utility power supply network, such as an indoor electrical outlet or the interface of another power supply end. However, those electrical appliances whose batteries are running out of power have to be connected to the utility power supply network continually in order to operate, albeit at the expense of portability. Separable batteries are removable from the electrical appliances so that the batteries are charged externally and independently. The advantage of separable batteries is that they are highly replaceable. For instance, when separable batteries of electrical appliances have run out of power, if another battery with appropriate specification is fully charged beforehand, it will be feasible to change the batteries instantly to thereby facilitate the subsequent use and portability of the electrical appliances. However, to meet the aforesaid requirement, the separable batteries require a self-contained charger for use in charging.

A commercially available charger essentially comprises a slot which a battery can be inserted into and a charging terminal fixed in place inside the slot. The charging terminal is connected to a power circuit built in a charger, and the power circuit is further connected to a utility power supply network or an interface of another power supply end. The charging terminal of the battery and the charging terminal of the slot correspond in position to each other. A user can insert the battery into the slot such that the charging terminal of the battery matches and connects with the charging terminal of the charger to thereby form a circuit, and therefore the battery can be charged. It is important that the charging terminal of the battery is fully and firmly connected to the charging terminal of the charger to thereby prevent power interruption which might otherwise occur because of loose contact or poor contact. To this end, a conventional charger is designed in a manner that a clamping structure disposed inside the slot can generate a large clamping force (under which, for example, a battery is snugly held by the clamping structure inside the slot and therefore fixed in place) or a fixing mechanism (such as a snap-engaging element for holding a battery by snap-engagement) is optionally disposed inside the slot.

SUMMARY OF THE INVENTION

To allow a charging terminal of a battery to be fully and firmly connected to a charging terminal of a conventional charger, the conventional charger is designed in a manner that a clamping structure disposed inside a slot can generate a large clamping force or a fixing mechanism is optionally disposed inside the slot. However, the aforesaid advantage is achieved at the expense of ease of use. For instance, it is time-consuming and laborious for the user to take out the battery, as the user must take out the battery by both hands, with one hand pressing on the charger and the other hand generating a pulling force for taking the battery out. Alternatively, the user has to perform a specific loosening operation on the fixing mechanism in order to take the battery out. In view of this, the present invention provides a charging device whereby not only can a battery be firmly inserted into the charging device but it is easy to insert and take out the battery.

In an embodiment of the present invention, a charging device comprises a charging base and at least one hook portion. The charging base has a receiving chamber for receiving a battery. The receiving chamber comprises a first sidewall. The first sidewall has a first side and a second side opposing the first side. The hook portion is disposed on the first sidewall, positioned proximate to the first side of the first sidewall, and adapted to fix the battery in place. When the battery begins to rotate under an applied force to thereby disconnect with the hook portion, the fulcrum of the rotating battery is positioned proximate to the second side of the first sidewall.

The receiving chamber further comprises a second sidewall. The second sidewall connects with the second side of the first sidewall and tilts. The second sidewall has a shortest distance between an end of an opening of the receiving chamber and an axis of the receiving chamber and has another shortest distance between an end of a bottom of the receiving chamber and the axis of the receiving chamber, wherein the former distance is larger than the latter distance.

In an embodiment of the present invention, the charging device further comprises at least two hook portions spaced apart from each other.

In an embodiment of the present invention, the charging base further comprises a charging terminal disposed on the first sidewall. The charging base further comprises a limiting rib. The limiting rib is disposed on the first sidewall of the receiving chamber. The limiting rib comprises a first end adjacent to an opening of the receiving chamber and a second end adjacent to the charging terminal. The height of the limiting rib increases gradually relative to the first sidewall in the direction from the first end to the second end. The second end of the limiting rib is positioned proximate to the charging terminal.

In an embodiment of the present invention, the charging base further comprises a charging terminal fixing portion disposed on the first sidewall of the receiving chamber. The charging terminal fixing portion comprises two spaced-apart lateral plates, a top plate and a guiding baffle. The two lateral plates are perpendicularly connected to the first sidewall. The top plate is connected to an end of each of the two lateral plates perpendicularly connected to the first sidewall, wherein the ends of the two lateral plates point away from the first sidewall, with the charging terminal disposed between the two lateral plates and the top plate, wherein the second end of the limiting rib is connected to the lateral plates and positioned proximate to an opening of the receiving chamber. The guiding baffle is disposed on the top plate.

In an embodiment of the present invention, the hook portion comprises a resilient arm and a protruding portion. The resilient arm has an end connected to the bottom of the receiving chamber. The resilient arm has another end corresponding in position to the first sidewall. Therefore, the other end of the resilient arm undergoes resilient displacement relative to the first sidewall. The protruding portion is disposed at the other end of the resilient arm.

The resilient arm comprises a first segment and a second segment connected to the first segment, and the first sidewall dents to form a way-giving recess, with the first segment connecting with bottom of the receiving chamber, the second segment corresponding in position to the way-giving recess, and the protruding portion being disposed at the second segment.

The protruding portion comprises an upward sloping surface facing an opening of the receiving chamber. The protruding portion comprises a downward sloping surface facing the bottom of the receiving chamber.

In conclusion, the present invention provides a charging device which comprises a charging base with a receiving chamber and a hook portion such that a user can put a battery in the receiving chamber easily to allow the battery to be fully and firmly engaged with the charging base and the hook portion, thereby preventing power interruption which might otherwise occur because of loose contact or poor contact. To take out the battery, the user rotates the battery slightly about a fulcrum to thereby detach the battery from the hook portion and take out the battery freely. A point of the bottom of the receiving chamber is in contact with a base angle of the battery and functions as the fulcrum. Accordingly, it is convenient, quick and easy for the user to operate the charging device of the present invention.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE EMBODIMENTS

Figure 1:
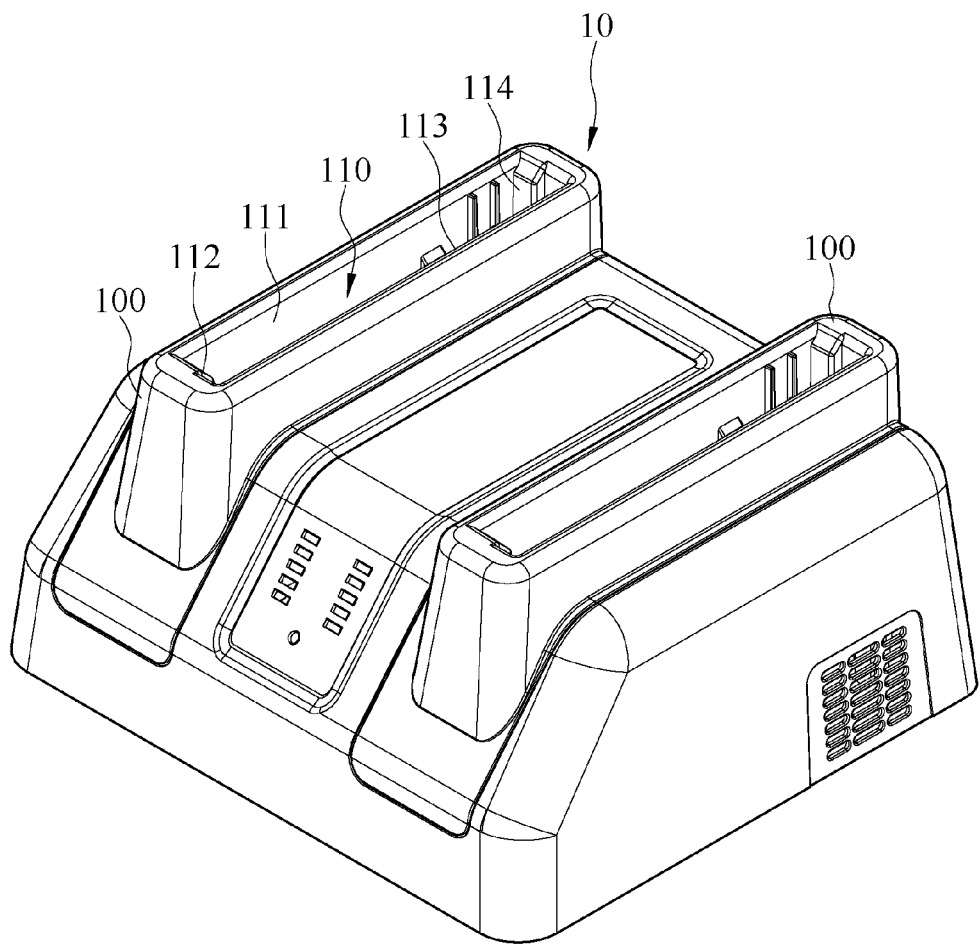
FIG. 1 is a schematic view of a charging device according to an embodiment of the present invention.

Referring to FIG. 1, there is shown a schematic view of a charging device 10 according to an embodiment of the present invention. In this embodiment, the charging device 10 has two charging bases 100, but the present invention is not limited thereto. In another embodiment, the charging device has one or at least three charging bases.

Figure 2:
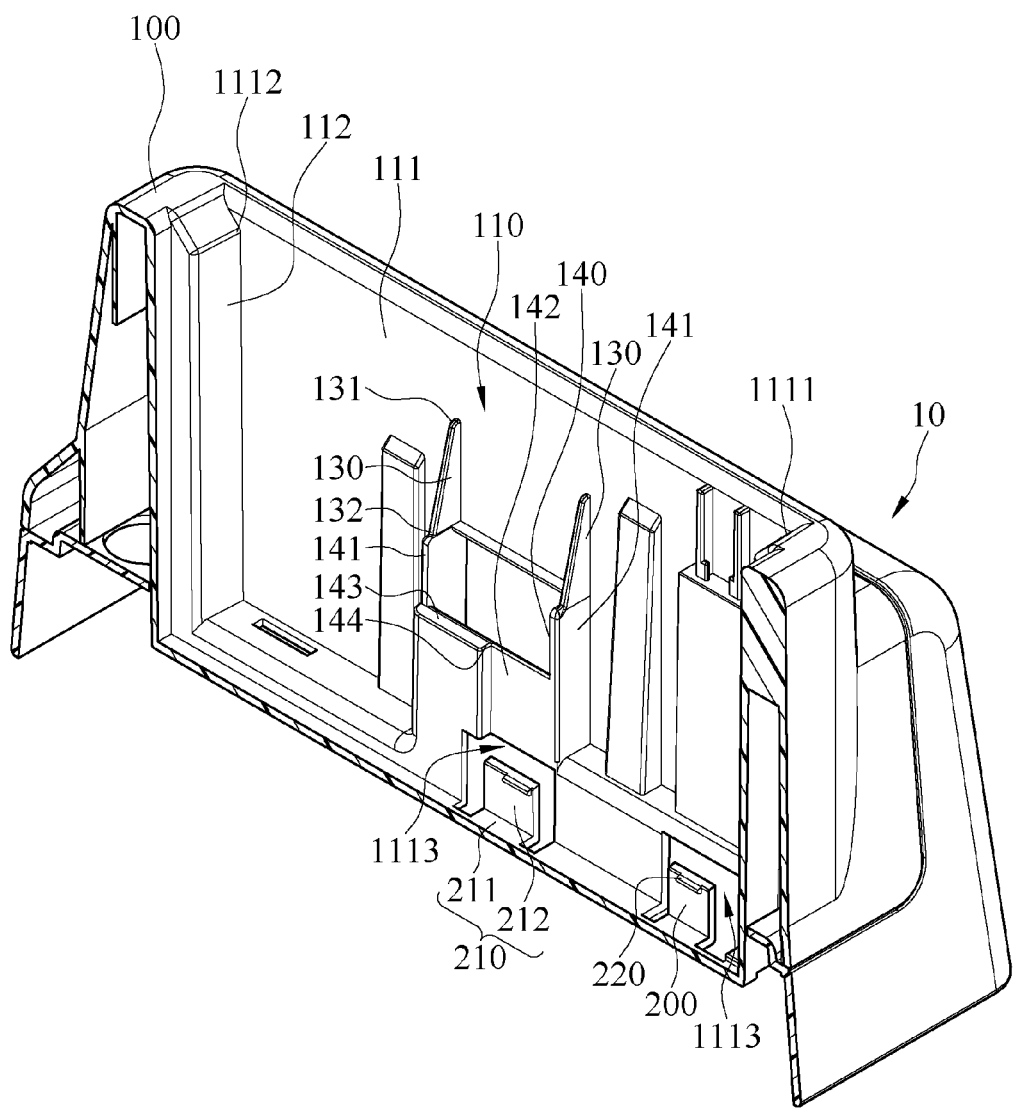
FIG. 2 is a cross-sectional view of a charging base and a hook portion according to the embodiment of the present invention.

FIG. 2 a cross-sectional view of the charging base 100 and a hook portion 200 according to the embodiment of the present invention. Referring to FIG. 1 and FIG. 2, in this embodiment, the charging device 10 further comprises the hook portions 200, and the charging bases 100 each have therein two hook portions 200, but the present invention is not limited thereto. In another embodiment, each charging base has one or at least three hook portions. The charging base 100 has a receiving chamber 110 for receiving a battery applicable to the charging device 10. The receiving chamber 110 comprises a first sidewall 111, a second sidewall 112, a third sidewall 113 and a fourth sidewall 114. The first sidewall 111 has a first side 1111 and a second side 1112 opposite the first side 1111. The second sidewall 112 connects with the second side 1112 of the first sidewall 111. The third sidewall 113 is opposite the first sidewall 111. The fourth sidewall 114 connects with the first side 1111 of the first sidewall 111.

Figure 3:
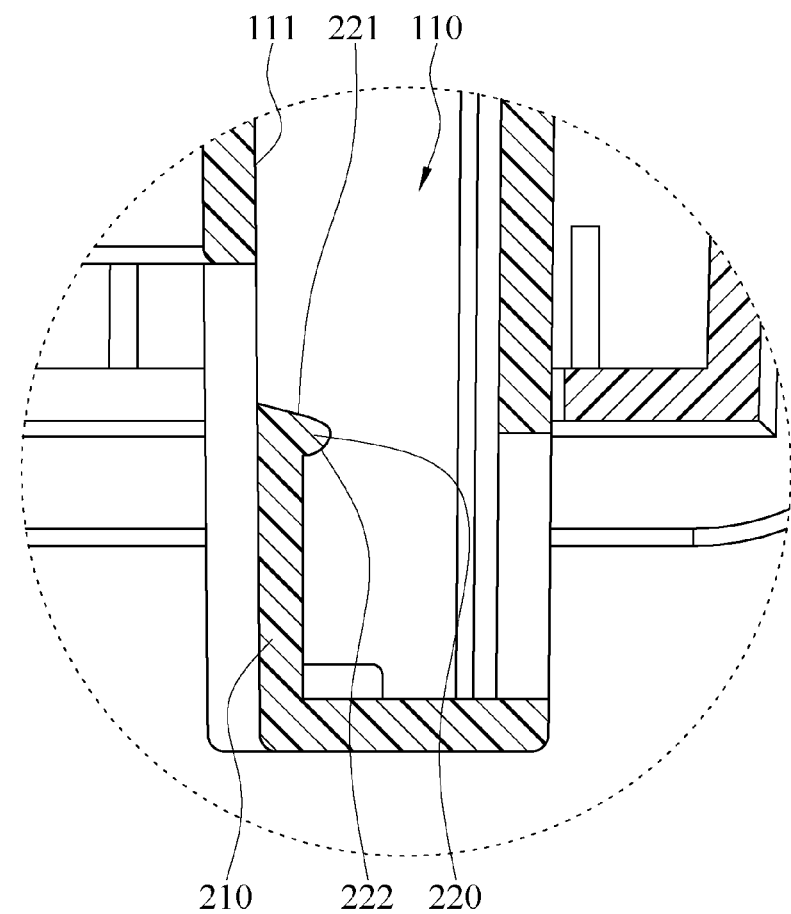
FIG. 3 is a partial cross-sectional view of the hook portion according to the embodiment of the present invention.

FIG. 3 is a partial cross-sectional view of the hook portion 200 according to the embodiment of the present invention. Referring to FIG. 2 and FIG. 3, the hook portion 200 fixes the battery in place. In this embodiment, the two hook portions 200 are disposed on the first sidewall 111 and positioned proximate to the bottom of the receiving chamber 110. The two hook portions 200 are positioned proximate to the first side 1111 of the first sidewall 111. Therefore, the two hook portions 200 are closer to the fourth sidewall 114 than the second sidewall 112. The two hook portions 200 are spaced apart from each other, with one hook portion 200 closer to the fourth sidewall 114 than the other hook portion 200 is. The hook portions 200 each comprise a resilient arm 210 and a protruding portion 220. One end of the resilient arm 210 connects with the bottom of the receiving chamber 110. The other end of the resilient arm 210 corresponds in position to the first sidewall 111. The protruding portion 220 is disposed at the other end of the resilient arm 210. In this embodiment, the resilient arm 210 comprises a first segment 211 and a second segment 212 which connect with each other. The first segment 211 and the second segment 212 together form an L-shaped structure. The first segment 211 connects with the bottom of the receiving chamber 110. The second segment 212 corresponds in position to the first sidewall 111. The protruding portion 220 is disposed at the second segment 212 and positioned distal to one end of the first segment 211. The protruding portion 220 protrudes in the direction away from the first sidewall 111. In this embodiment, the first sidewall 111 dents to form two way-giving recesses 1113. The second segments 212 of the resilient arms 210 of the two hook portions 200 correspond in position to the two way-giving recesses 1113, respectively. In another embodiment, there is only one way-giving recess, and the way-giving recess corresponds in position to one or more hook portions. The second segment 212 of the resilient arm 210 undergoes resilient displacement relative to the first sidewall 111 to the extent allowed by the limit of the resilience of the material which the resilient arm 210 is made of. The way-giving recesses 1113 provide the way-giving space required for the resilient displacement of the resilient arm 210. Referring to FIG. 3, in this embodiment, the protruding portion 220 comprises an upward sloping surface 221 and a downward sloping surface 222. The upward sloping surface 221 of the protruding portion 220 faces the opening of the receiving chamber 110. The downward sloping surface 222 of the protruding portion 220 faces the bottom of the receiving chamber 110.

Figure 4:
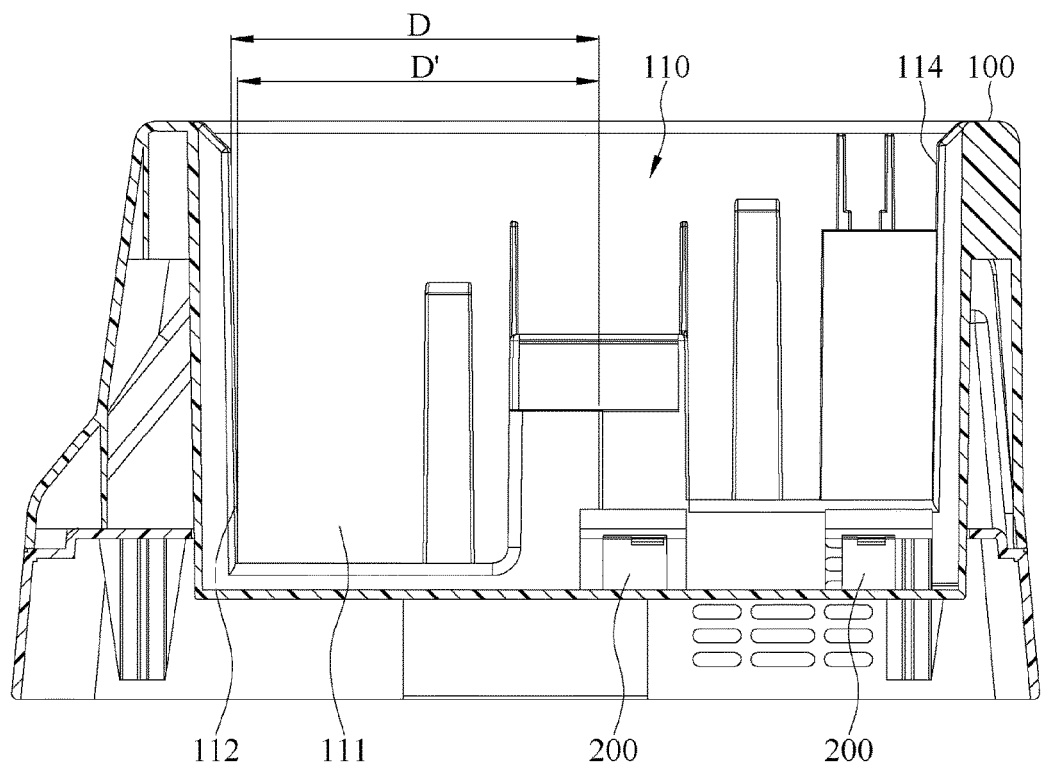
FIG. 4 is a cross-sectional view of the charging base and the hook portions taken at another angle according to the embodiment of the present invention.

Referring to FIG. 4, there is shown a cross-sectional view of the charging base 100 and the hook portions 200 taken at another angle according to the embodiment of the present invention. FIG. 4 differs from FIG. 2 by an angle of view of 90 degrees. In this embodiment, the second sidewall 112 tilts such that an included angle is formed between the second sidewall 112 and the perpendicular direction of the bottom of the receiving chamber 110. The second sidewall 112 tilts slightly upward and outward (i.e., leftward in FIG. 4). The second sidewall 112 has the shortest distance D between one end of the opening of the receiving chamber 110 and the axis of the receiving chamber 110. The second sidewall 112 has the shortest distance D' between one end of the bottom of the receiving chamber 110 and the axis of the receiving chamber 110. Distance D is larger than distance D'. In this embodiment, the fourth sidewall 114 also tilts such that an included angle is formed between the fourth sidewall 114 and the perpendicular direction of the bottom of the receiving chamber 110. The fourth sidewall 114 tilts slightly upward and outward (i.e., rightward in FIG. 4). The shortest distance of the fourth sidewall 114 between one end of the opening of the receiving chamber 110 and the axis of the receiving chamber 110 is larger than the shortest distance of the fourth sidewall 114 between one end of the bottom of the receiving chamber 110 and the axis of the receiving chamber 110. Therefore, the width of the opening between the second sidewall 112 and the fourth sidewall 114 is slightly larger than the width of the bottom between the second sidewall 112 and the fourth sidewall 114. In another embodiment, the fourth sidewall does not tilt such that the fourth sidewall is perpendicular to the bottom of the receiving chamber. Referring to FIG. 4, both the two hook portions 200 are disposed to the right of the axis such that the two hook portions 200 are closer to the fourth sidewall 114 than the second sidewall 112. In another embodiment, there is only one hook portion, and the hook portion is disposed to the right of the axis. To enhance the stability of the battery fixed in place by the hook portion, it is feasible to increase the width of the hook portion and the protruding portion, wherein the width is measured horizontally as shown in FIG. 4.

Referring to FIG. 2, the charging base 100 further comprises a limiting rib 130, a charging terminal (not shown) and a charging terminal fixing portion 140. The charging terminal of the charging base 100 is fixed in place by the charging terminal fixing portion 140. The charging terminal of the charging base 100 and the charging terminal of the battery correspond in position to each other, match each other, and connect with each other. The structures of charging terminals are understandable to persons skilled in the art and therefore are not reiterated herein. The charging terminal fixing portion 140 is disposed on the first sidewall 111 of the receiving chamber 110. The charging terminal fixing portion 140 comprises two spaced-apart lateral plates 141, a top plate 142 and a guiding baffle 143. The two lateral plates 141 are perpendicularly connected to the first sidewall 111. The top plate 142 connects with one end of each of the two lateral plates 141, wherein the one end of each of the two lateral plates 141 faces away from the first sidewall 111. A receiving space is formed between the two lateral plates 141 and the top plate 142. The charging terminal of the charging base 100 is received in and fixed to the receiving space such that the charging terminal of the charging base 100 is disposed between the two lateral plates 141 and the top plate 142 and positioned proximate to the first sidewall 111. The guiding baffle 143 is disposed on the top plate 142 and protrudes in the direction away from the first sidewall 111. In this embodiment, the guiding baffle 143 is positioned proximate to one of the lateral plates 141. A gap 144 is defined between the guiding baffle 143 and the top plate 142 with reference to the other lateral plates 141. In this embodiment, the limiting rib 130 is disposed on the first sidewall 111. The limiting rib 130 comprises a first end 131 and a second end 132. The first end 131 is positioned proximate to the opening of the receiving chamber 110. The second end 132 connects with the charging terminal fixing portion 140 (i.e., the second end 132 is positioned proximate to the charging terminal of the charging base 100.) The height of the limiting rib 130 increases gradually relative to the first sidewall 111 in the direction from the first end 131 to the second end 132. Therefore, the top surface of the limiting rib 130 tilts relative to the first sidewall 111. The first end 131 is positioned at the lowest point of the top surface of the limiting rib 130 relative to the first sidewall 111. The second end 132 is positioned at the highest point of the top surface of the limiting rib 130 relative to the first sidewall 111. The second end 132 is connected to the lateral plates 141 and positioned proximate to the opening of the receiving chamber 110. In this embodiment, the limiting ribs 130 are in the number of two and are spaced apart from each other. The limiting ribs 130 are spaced apart such that the charging terminal of the battery can pass through the space between the limiting ribs 130. The two limiting ribs 130 correspond in position to the two lateral plates 141, respectively, and therefore the second ends 132 of the two limiting ribs 130 are connected to the two lateral plates 141, respectively, and positioned proximate to the opening of the receiving chamber 110. In another embodiment, there is only one limiting rib, and the limiting rib connects with one of the two lateral plates.

Figure 5:
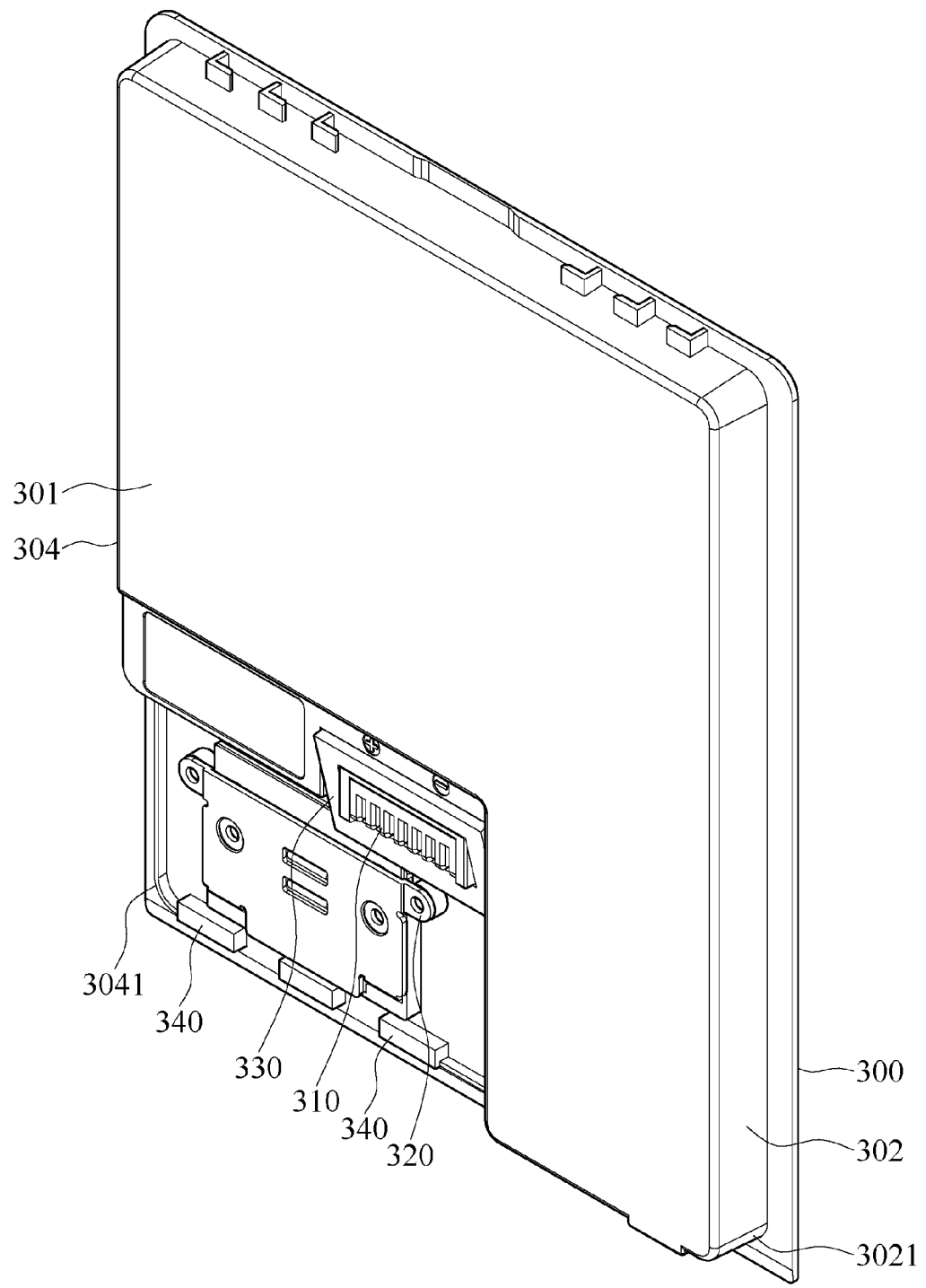
FIG. 5 is a schematic view of a battery which matches the charging device.

Referring to FIG. 5, there is shown a schematic view of a battery 300 which matches the charging device 10 according to the embodiment of the present invention. The battery 300 comprises a first surface 301, a second surface 302, a third surface (not shown) and a fourth surface 304. The second surface 302 and the fourth surface 304 flank the first surface 301. The third surface is opposite the first surface 301. The battery 300 further comprises a charging terminal 310, a guiding block 320, a limiting oblique surface 330 and two engaging blocks 340. The charging terminal 310, the guiding block 320, the limiting oblique surface 330 and the two engaging blocks 340 are disposed on the first surface 301 of the battery 300. The charging terminal 310 is embedded under the limiting oblique surface 330. The two engaging blocks 340 are disposed at the bottom of the battery 300. The guiding block 320 is disposed between the charging terminal 310 and the two engaging blocks 340. The charging terminal of the charging base 100 corresponds in position to the charging terminal 310. The guiding baffle 143 corresponds in position to the guiding block 320. The two limiting ribs 130 correspond in position to the limiting oblique surfaces 330, respectively. The two hook portions 200 correspond in position to the two engaging blocks 340, respectively. In this embodiment, the engaging blocks 340, which the hook portions 200 correspond in position to, are hexahedrons. In another embodiment, depending on the structure difference between the engaging blocks for the battery (for example, the engaging blocks each have an upward sloping surface and/or downward sloping surface corresponding in position to the protruding portion of the hook portion), the protruding portion of the hook portion has an upward sloping surface, a downward sloping surface, or none.

Figure 6:
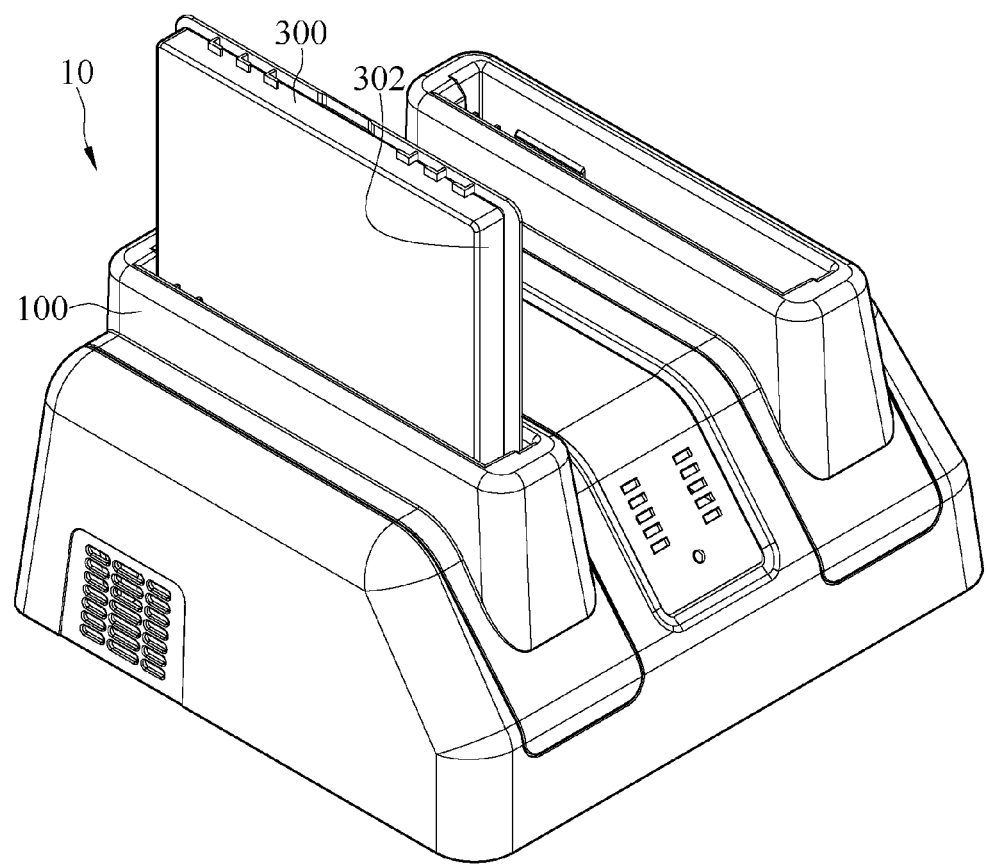
FIG. 6 is a schematic view of the battery inserted into the charging base.

FIG. 6 is a schematic view of the battery 300 inserted into the charging base 100 according to the embodiment of the present invention. Referring to FIG. 2, FIG. 5 and FIG. 6, to put the battery 300 into the charging base 100 for charging, a user aligns the first surface 301, the second surface 302 and the fourth surface 304 of the battery 300 with the first sidewall 111, the second sidewall 112 and the fourth sidewall 114 of the receiving chamber 110, respectively, and then allows the battery 300 to fall under its own weight into the receiving chamber 110.

Figure 7:
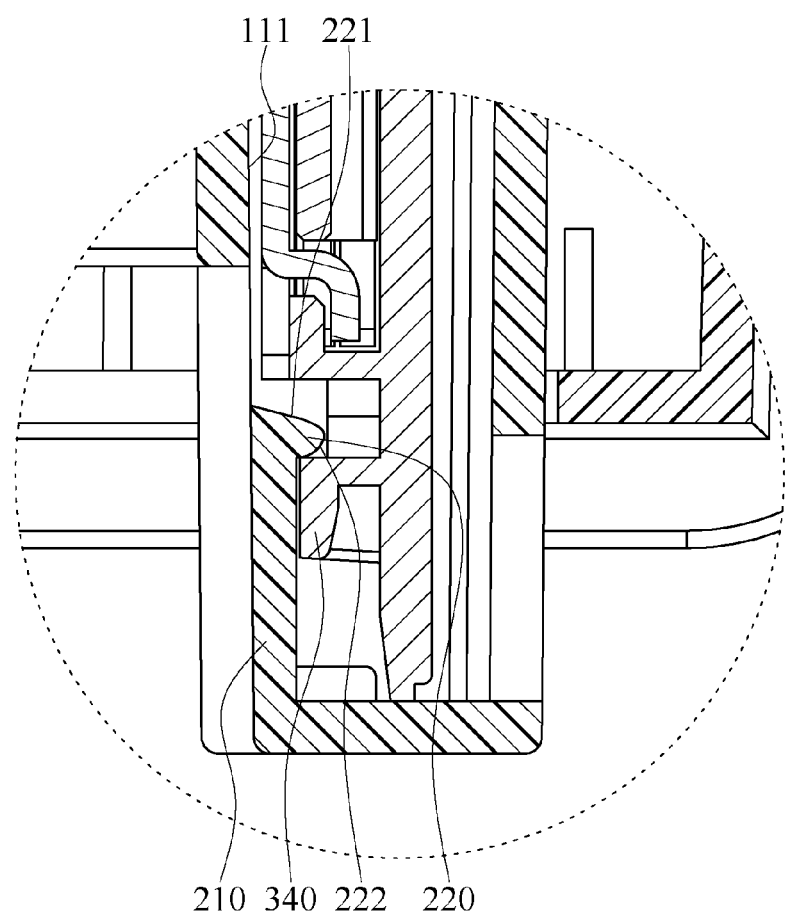
FIG. 7 is a partial cross-sectional view of the hook portion and the battery which are snap-engaged with each other.

FIG. 7 is a partial cross-sectional view of the hook portion 200 and the engaging block 340 of the battery 300 which are snap-engaged with each other. Referring to FIG. 2, FIG. 5 and FIG. 7, when the battery 300 falls under its own weight into the receiving chamber 110 and the engaging block 340 comes into contact with the protruding portion 220, the upward sloping surface 221 of the protruding portion 220 spreads the stress passed by the engaging block 340 to the protruding portion 220 such that the stress component exerted on the protruding portion 220 goes in a direction perpendicular to the first sidewall 111. Therefore, the first segment 211 of the resilient arm 210 undergoes resilient displacement toward the way-giving recesses 1113 of the first sidewall 111, and the protruding portion 220 moves toward the first sidewall 111 to thereby give way to the engaging block 340. After the engaging block 340 has moved downward and passed the protruding portion 220, the resilient arm 210 moves resiliently, under a resilient restoring force thereof, away from the first sidewall 111 to therefore allow the protruding portion 220 to move away from the first sidewall 111 and engage with the top end of the engaging block 340. Referring to FIG. 7, in the aforesaid state, the hook portion 200 and the engaging block 340 are engaged with each other such that the battery 300 is firmly held in the receiving chamber 110. Therefore, even if the charging device 10 is turned upside down, the battery 300 will not get detached and fall under its own weight.

During the process in which the battery 300 falls under its own weight into the receiving chamber 110, the limiting oblique surface 330 comes into contact with the limiting ribs 130 first, and the gradient of the limiting oblique surface 330 equals the gradient of the top surface of the limiting rib 130, and in consequence the limiting oblique surface 330 moves along the limiting ribs 130 to therefore allow the charging terminal 310 between the two limiting ribs 130 to ascend gradually and get aligned with the charging terminal of the charging base 100.

Figure 8:
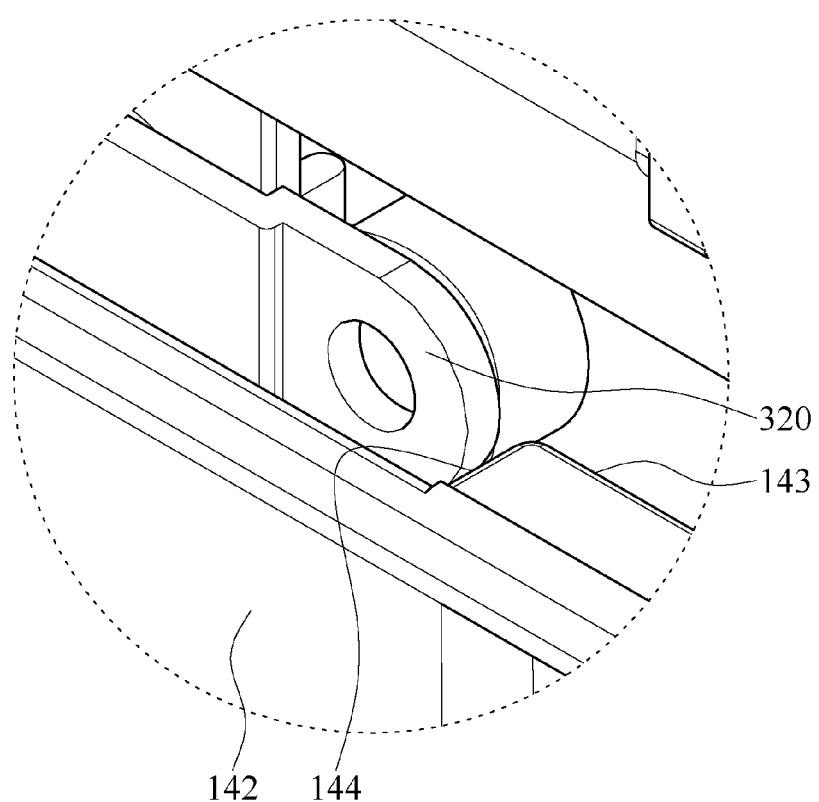
FIG. 8 is a partial cross-sectional view of a guiding baffle and the battery which match each other.

FIG. 8 is a partial cross-sectional view of the guiding baffle 143 and the battery 300 which match each other. Referring to FIG. 2, FIG. 5 and FIG. 8, when the limiting oblique surface 330 moves along the limiting rib 130 to cause the charging terminal 310 to ascend gradually and get aligned with the charging terminal 310 of the charging base 100, the guiding block 320 comes into contact with the guiding baffle 143. Furthermore, due to the aforesaid structure-based guiding relationship between the guiding block 320 and the guiding baffle 143, during the movement of the guiding block 320 toward the bottom of the receiving chamber 110, the guiding block 320 tilts leftward (i.e., in the direction shown in FIG. 8) slightly to therefore abut against the gap 144 between the guiding baffle 143 and the top plate 142. During the aforesaid process, the charging terminal 310 of the battery 300 is guided to be aligned with and inserted into the charging terminal 310 of the charging base 100.

Figure 9:
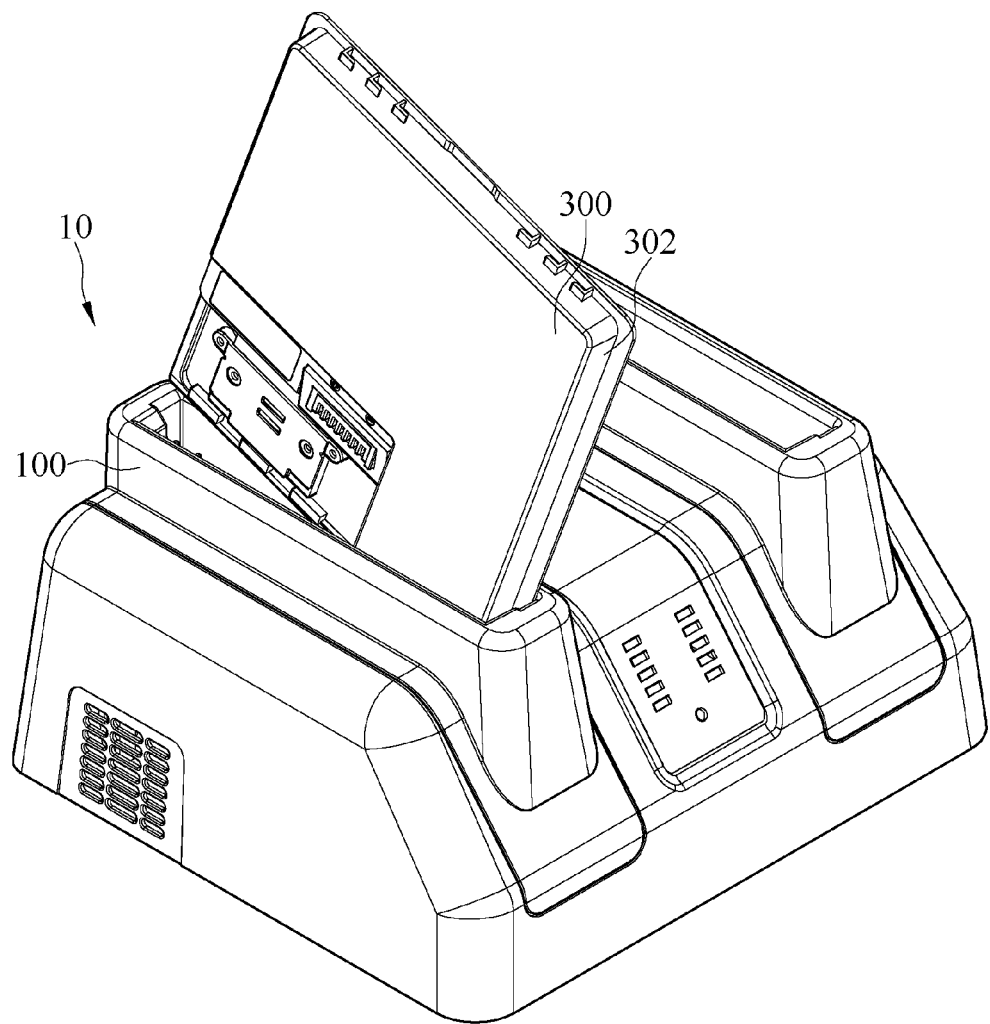
FIG. 9 is a schematic view of the process of taking the battery out of the charging base.

FIG. 9 is a schematic view of the process of taking the battery 300 out of the charging base 100. Referring to FIG. 2, FIG. 5 and FIG. 9, in this embodiment, the battery 300 rotates under an applied force to thereby disconnect from the hook portion 200. The fulcrum of the rotating battery 300 is positioned proximate to the second side 1112 of the first sidewall 111 and the second sidewall 112. After the battery 300 has been disposed inside the receiving chamber 110 fully, a second surface base angle 3021 (shown in FIG. 5) of the battery 300 is located at the bottom of the receiving chamber 110 and positioned proximate to the second sidewall 112. At the point in time when the user is going to take the battery 300 out of the charging base 100, the fulcrum is located at a point of the bottom of the receiving chamber 110, wherein the point of the bottom of the receiving chamber 110 is in contact with the second surface base angle 3021. The user applies a small force for rotating the battery 300 clockwise (i.e., in the direction shown in FIG. 9) such that the two engaging blocks 340 are detached from the hook portion 200. When the user applies the force, the second surface base angle 3021 of the battery 300 presses on the bottom of the receiving chamber 110, and the second surface 302 of the battery 300 tilts toward the second sidewall 112 of the receiving chamber 110. Since the second sidewall 112 tilts, the second sidewall 112 does not impede the tilting of the second surface 302 of the battery 300. Furthermore, a fourth surface base angle 3041 (shown in FIG. 5) of the battery 300 rotates clockwise, and the two engaging blocks 340 exert a stress upon the protruding portion 220. The downward sloping surface 222 of the protruding portion 220 spreads the stress such that the resilient arm 210 moves toward the first sidewall 111 to thereby allow the two engaging blocks 340 to move upward and pass the protruding portion 220. After the two engaging blocks 340 have passed the protruding portion 220, the battery 300 gets disengaged from the charging device 10 such that the user can take the battery 300 out of the receiving chamber 110 freely. In the course of the rotation of the battery 300, a specific point of the receiving chamber 110 functions as the fulcrum and is subjected to a downward stress (which originates from the downward component of a force exerted by the user upon the battery 300), and therefore the user is able to press on the charging device 10 while applying a rotating force under which the two engaging blocks 340 rotate and escape from the hook portion 200. As a result, the user can perform the aforesaid operation single-handedly to take out the battery 300 conveniently, quickly and easily, thereby dispensing with the hassles of pressing on the charging device 10 by one hand and pulling out the battery 300 by the other hand.

The present invention is disclosed above by preferred embodiments. However, persons skilled in the art should understand that the preferred embodiments are illustrative of the present invention only, but should not be interpreted as restrictive of the scope of the present invention. Therefore, slight changes and modifications made to the aforesaid embodiments should fall within the scope of the present invention. Accordingly, the legal protection for the present invention should be defined by the appended claims.

What is claimed is:
1. A charging device, comprising:
   a charging base having a receiving chamber for receiving a battery, the receiving chamber having a first sidewall with a first side and a second side opposing the first side; and
   at least one hook portion disposed on the first sidewall and positioned proximate to the first side of the first sidewall to fix the battery in place when the battery is received in the receiving chamber, wherein the at least one hook portion comprises a resilient arm and a protruding portion, the protruding portion comprising an upward sloping surface and a downward sloping surface, wherein a fulcrum of the battery is positioned proximate to the second side of the first sidewall when the battery is rotated in a plane parallel to the first sidewall and away from the first side, and the resilient arm is arranged to undergo resilient displacement in a direction perpendicular to the plane rotation of the battery and towards the first sidewall when the battery is so rotated to thereby disconnect the battery from the at least one hook portion.

2. The charging device of claim 1, wherein the receiving chamber further has a second sidewall connecting with the second side of the first sidewall and tilting, wherein the second sidewall has a shortest distance between an end of an opening of the receiving chamber and an axis of the receiving chamber and has another shortest distance between an end of a bottom of the receiving chamber and the axis of the receiving chamber, wherein the former distance is larger than the latter distance.

3. The charging device of claim 1, comprising at least two hook portions spaced apart from each other.

4. The charging device of claim 1, wherein the charging base further comprises a charging terminal disposed on the first sidewall.

5. The charging device of claim 4, wherein the charging base further comprises a limiting rib being disposed on the first sidewall of the receiving chamber, having a first end adjacent to an opening of the receiving chamber, having a second end adjacent to the charging terminal, and having a height increasing gradually relative to the first sidewall in direction from the first end to the second end.

6. The charging device of claim 5, wherein the second end of the limiting rib is positioned proximate to the charging terminal.

7. The charging device of claim 5,
wherein the charging base further comprises a charging terminal fixing portion disposed on the first sidewall of the receiving chamber and comprising:
two spaced-apart lateral plates;
a top plate connected to an end of each of the two lateral plates perpendicularly connected to the first sidewall, wherein the ends of the two lateral plates point away from the first sidewall, with the charging terminal disposed between the two lateral plates and the top plate, wherein the second end of the limiting rib is connected to the lateral plates and positioned proximate to an opening of the receiving chamber; and
a guiding baffle disposed on the top plate.

8. The charging device of claim 1, wherein the resilient arm has an end connected to a bottom of the receiving chamber and another end corresponding in position to the first sidewall, thereby allowing the other end of the resilient arm to undergo resilient displacement relative to the first sidewall, wherein the protruding portion is disposed at the other end of the resilient arm.

9. The charging device of claim 8, wherein the resilient arm comprises a first segment and a second segment connected to the first segment, and the first sidewall comprises a way-giving recess, with the first segment connecting with bottom of the receiving chamber, the second segment corresponding in position to the way-giving recess, and the protruding portion being disposed at the second segment.

10. The charging device of claim 8, wherein the upward sloping surface faces an opening of the receiving chamber.

11. The charging device of claim 8, wherein the downward sloping surface faces the bottom of the receiving chamber.

12. The charging device of claim 1, wherein the first sidewall comprises a way-giving recess arranged such that when the resilient arm undergoes resilient displacement in the direction perpendicular to the plane rotation of the battery and towards the first sidewall, a portion of the resilient arm is pushed into the way-giving recess.

13. A charging device, comprising:
a charging base having a receiving chamber for receiving a battery and a charging terminal, the receiving chamber having a first sidewall with a first side and a second side opposing the first side, wherein the charging terminal disposed on the first sidewall, and wherein the charging base further comprises a limiting rib being disposed on the first sidewall of the receiving chamber, having a first end adjacent to an opening of the receiving chamber, having a second end adjacent to the charging terminal, and having a height increasing gradually relative to the first sidewall in direction from the first end to the second end; and
at least one hook portion disposed on the first sidewall and positioned proximate to the first side of the first sidewall to fix the battery in place;
wherein a fulcrum of the battery is positioned proximate to the second side of the first sidewall when the battery rotates under an applied force to thereby disconnect from the at least one hook portion;
wherein the charging base further comprises a charging terminal fixing portion disposed on the first sidewall of the receiving chamber and comprising:
two spaced-apart lateral plates;
a top plate connected to an end of each of the two lateral plates perpendicularly connected to the first sidewall, wherein the ends of the two lateral plates point away from the first sidewall, with the charging terminal disposed between the two lateral plates and the top plate, wherein the second end of the limiting rib is connected to the lateral plates and positioned proximate to an opening of the receiving chamber; and
a guiding baffle disposed on the top plate.

14. The charging device of claim 13, wherein the receiving chamber further has a second sidewall connecting with the second side of the first sidewall and tilting, wherein the second sidewall has a shortest distance between an end of an opening of the receiving chamber and an axis of the receiving chamber and has another shortest distance between an end of a bottom of the receiving chamber and the axis of the receiving chamber, wherein the former distance is larger than the latter distance.

15. The charging device of claim 13, comprising at least two hook portions spaced apart from each other.

16. The charging device of claim 13, wherein the second end of the limiting rib is positioned proximate to the charging terminal.

17. The charging device of claim 13, wherein the at least one hook portion comprises a resilient arm and a protruding portion, the resilient arm having an end connected to a bottom of the receiving chamber and another end corresponding in position to the first sidewall, thereby allowing the other end of the resilient arm to undergo resilient displacement relative to the first sidewall, wherein the protruding portion is disposed at the other end of the resilient arm.

18. The charging device of claim 17, wherein the resilient arm comprises a first segment and a second segment connected to the first segment, and the first sidewall comprises a way-giving recess, with the first segment connecting with bottom of the receiving chamber, the second segment corresponding in position to the way-giving recess, and the protruding portion being disposed at the second segment.

19. The charging device of claim 17, wherein the protruding portion comprises an upward sloping surface facing an opening of the receiving chamber.

20. The charging device of claim 17, wherein the protruding portion comprises a downward sloping surface facing the bottom of the receiving chamber.

* * * * *